US012698168B2

(12) United States Patent
Huang et al.

(10) Patent No.: US 12,698,168 B2
(45) Date of Patent: Aug. 4, 2026

(54) CLAMPING AND PLACING DEVICE

(71) Applicant: USUN TECHNOLOGY CO., LTD.,
Taoyuan (TW)

(72) Inventors: Chiu-Fong Huang, New Taipei (TW);
Yang-Huan Hsu, New Taipei (TW)

(73) Assignee: USUN TECHNOLOGY CO., LTD.,
Taoyuan (TW)

( * ) Notice: Subject to any disclaimer, the term of this
patent is extended or adjusted under 35
U.S.C. 154(b) by 0 days.

(21) Appl. No.: 19/253,391

(22) Filed: Jun. 27, 2025

(65) Prior Publication Data

US 2026/0001733 A1     Jan. 1, 2026

(30) Foreign Application Priority Data

Jun. 28, 2024    (TW) ................................. 113206952

(51) Int. Cl.
B65G 61/00       (2006.01)
B25J 15/00       (2006.01)
F16L 1/06        (2006.01)

(52) U.S. Cl.
CPC .......... B65G 61/00 (2013.01); B25J 15/0028
(2013.01); F16L 1/06 (2013.01); B65G
2201/0217 (2013.01); B65G 2201/0276
(2013.01); B65G 2203/0283 (2013.01)

(58) Field of Classification Search
CPC ........ E21B 19/155; E21B 19/15; E21B 19/20;
E21B 19/14; E21B 19/00; B65G 1/0442;
B65G 2201/0276; B65G 2201/0282;
B65G 57/186; B65G 2201/0217; B65G
57/18; B65G 2203/0283; B25J 15/0028;
F16L 1/06
See application file for complete search history.

(56) References Cited

U.S. PATENT DOCUMENTS

| | | | | |
|---|---|---|---|---|
| 3,727,772 A | * | 4/1973 | Pauls ........................ | B25B 1/18 |
| | | | | 414/745.7 |
| 3,734,210 A | * | 5/1973 | Wilderman ............. | E21B 19/20 |
| | | | | 414/22.55 |
| 4,407,629 A | * | 10/1983 | Willis ................... | E21B 19/155 |
| | | | | 414/22.67 |
| 7,370,896 B2 | * | 5/2008 | Anderson ................ | B25J 15/08 |
| | | | | 901/39 |

(Continued)

*Primary Examiner* — Gregory W Adams
(74) *Attorney, Agent, or Firm* — ScienBiziP, P.C.

(57) ABSTRACT

The present application pertains to the field of pipe transport and relates to a clamping and placing device for clamping and releasing a pipe. The clamping and placing device comprises a bearing mechanism and a clamping and placing mechanism. The bearing mechanism includes a bearing seat provided with a bearing area. The clamping and placing mechanism includes a first clamping member, a second clamping member, a first pushing member, a first rotating member, and a second rotating member. The second clamping member and the first clamping member are configured to clamp the pipe in the bearing area. The first pushing member is configured to rotate through the bearing area to push the pipe out of the bearing area. The first rotating member is connected to the first pushing member and is configured to drive the first pushing member to rotate. The clamping and placing device facilitates rapid pipe release.

15 Claims, 4 Drawing Sheets

(56)  References Cited

U.S. PATENT DOCUMENTS

|  |  |  |  |  |
|---|---|---|---|---|
| 8,348,319 B2 * | 1/2013 | LaValley | ............... | E21B 19/155 |
|  |  |  |  | 294/81.61 |
| 8,985,928 B2 * | 3/2015 | Mark | ...................... | E21B 3/022 |
|  |  |  |  | 414/22.55 |
| 9,121,234 B2 * | 9/2015 | Flusche | ................... | E21B 19/20 |
| 10,919,736 B2 * | 2/2021 | Patterson | ................ | E21B 19/00 |
| 2004/0217612 A1 * | 11/2004 | Slettedal | ................. | E21B 19/14 |
|  |  |  |  | 294/115 |
| 2007/0092358 A1 * | 4/2007 | Innes | ........................ | E21B 7/02 |
|  |  |  |  | 414/22.51 |
| 2010/0126968 A1 * | 5/2010 | Page | .................. | B23K 37/0533 |
|  |  |  |  | 219/59.1 |
| 2010/0329823 A1 * | 12/2010 | Baumler | ................. | E21B 19/20 |
|  |  |  |  | 414/22.55 |
| 2015/0082598 A1 * | 3/2015 | Lavalley | ............... | E21B 19/168 |
|  |  |  |  | 29/428 |
| 2016/0160588 A1 * | 6/2016 | LaValley | ............... | E21B 19/164 |
|  |  |  |  | 81/57.34 |
| 2021/0180714 A1 * | 6/2021 | Sze | ...................... | B25J 15/0028 |

* cited by examiner

CLAMPING AND PLACING DEVICE

FIELD

The subject matter relates to pipe transport, and more particularly, to a clamping and placing device.

BACKGROUND

During production or transportation, pipes sometimes need to be repositioned, and during the repositioning process, pipes must be clamped to prevent uncontrolled movements of the pipes. In existing technologies, a clamping and placing device is used to grip the pipes. However, an additional mechanism is required to remove the pipes from the clamping and placing device, or after the clamping and placing device releasing the pipes, the pipes may roll away after releasing, resulting in low efficiency of the clamping and placing device in releasing the pipes.

Therefore, there is room for improvement in the art.

DETAILED DESCRIPTION

Implementations of the present technology will now be described, by way of example only, with reference to the attached figures.

Figure 1:
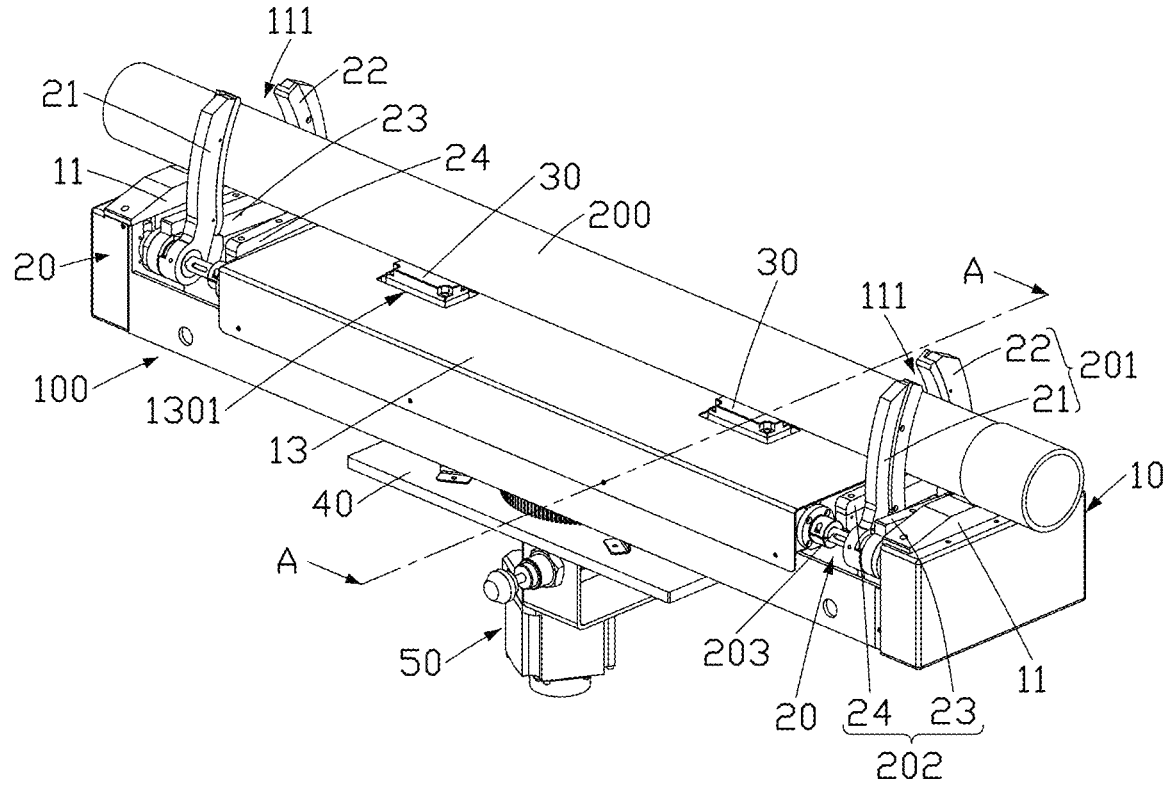
FIG. 1 is a diagrammatic view of a structural composition of a cooperation between a clamping and placing device and a pipe according to an embodiment of the present application.
Figure 2:
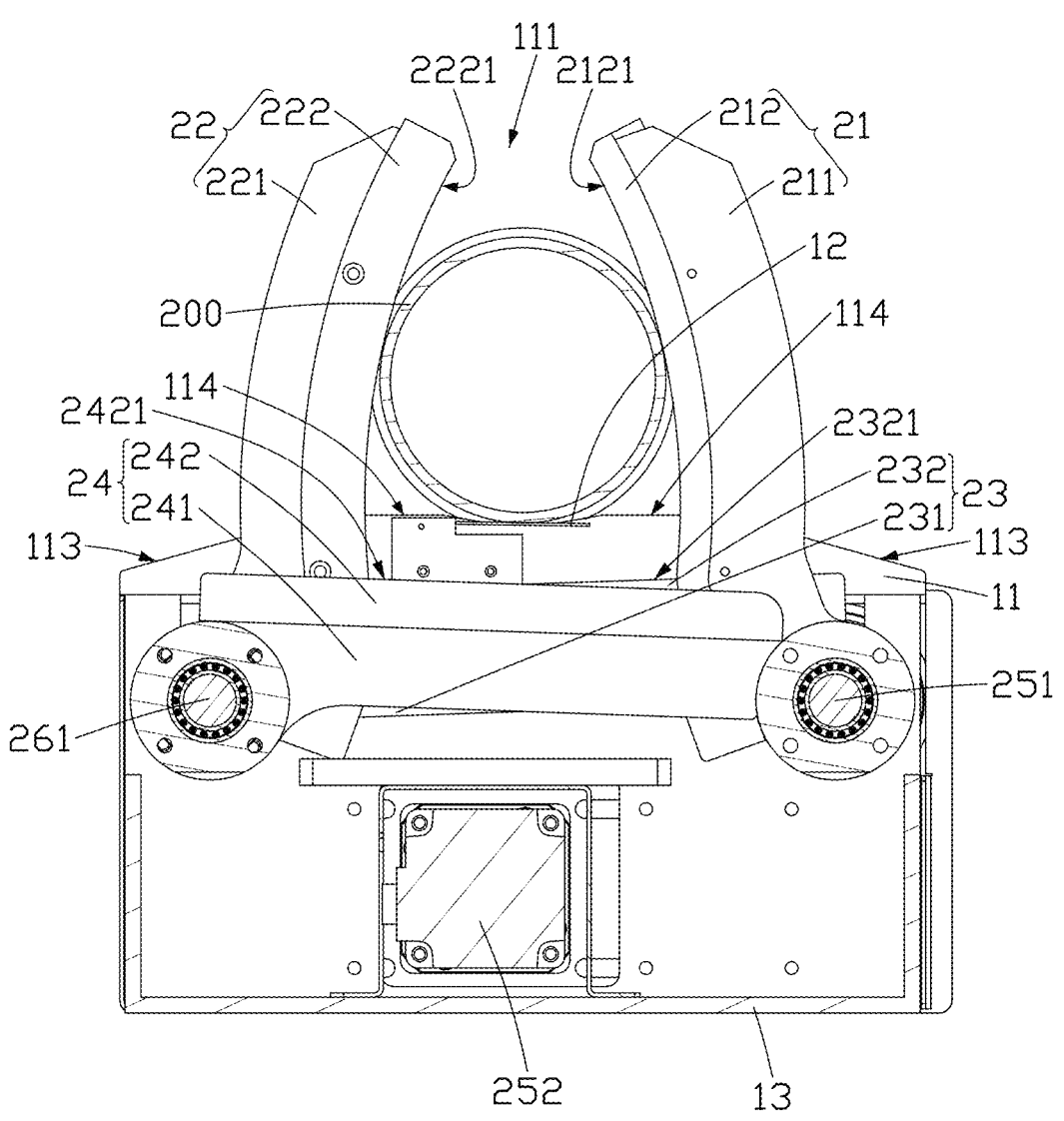
FIG. 2 is a cross-sectional schematic view taken along line A-A shown in FIG. 1, according to an embodiment of the present application.

Referring to FIGS. 1 to 2, an exemplary embodiment of the present application provides a clamping and placing device 100 for clamping and releasing a pipe 200. The clamping and placing device 100 includes a bearing mechanism 10 and a clamping and placing mechanism 20.

The bearing mechanism 10 includes a bearing seat 11. The bearing seat 11 is provided with a bearing area 111. The bearing area 111 is located on one side of the bearing seat 11.

The clamping and placing mechanism 20 includes a clamping mechanism 201, a pushing mechanism 202, and a rotating mechanism 203. The clamping mechanism 201 includes a first clamping member 21 and a second clamping member 22. The pushing mechanism 202 includes a first pushing member 23 and a second pushing member 24. The rotating mechanism 203 includes a first rotating member 25 and a second rotating member 26.

The first clamping member 21 and the first pushing member 23 are connected to the first rotating member 25. The first rotating member 25 is configured to drive the first clamping member 21 and first pushing member 23 to rotate.

The second clamping member 22 and the second pushing member 24 are connected to the second rotating member 26. The second rotating member 26 is configured to drive the second clamping member 22 and the second pushing member 24 to rotate.

The first clamping member 21 and the second clamping member 22 are configured to clamp the pipe 200 in the bearing area 111. The first pushing member 23 is configured to rotate through the bearing area 111, and the second pushing member 24 is configured to rotate through the bearing area 111.

When the pipe 200 is carried on the bearing area 111, the first rotating member 25 drives the first clamping member 21 to rotate, and the second rotating member 26 drives the second clamping member 22 to rotate. Both the first clamping member 21 and second clamping member 22 rotate toward the bearing area 111 to clamp the pipe 200.

When releasing the pipe 200, the first rotating member 25 drives the first clamping member 21 to rotate, and the second rotating member 26 drives the second clamping member 22 to rotate. Both the first clamping member 21 and second clamping member 22 rotate away from the bearing area 111 to release the pipe 200.

When the first clamping member 21 rotates away from the bearing area 111, the first pushing member 23 rotates together with the first clamping member 21. When the second clamping member 22 rotates away from the bearing area 111, the second pushing member 24 together with the second clamping member 22. The first pushing member 23 or the second pushing member 24 passes through the bearing area 111, or both the first pushing member 23 and the second pushing member 24 pass through the bearing area 111, thereby pushing the pipe 200 outward of the bearing area 111.

While the first clamping member 21 and second clamping member 22 move away from the pipe 200 to release the pipe 200, the first pushing member 23 and second pushing member 24 could push the pipe 200 out of the bearing area 111, reducing the time required to release the pipe 200 and improving the efficiency of releasing the pipe 200.

FIGS. 1 to 4 are schematic structural diagrams showing the first clamping member 21 and the second clamping member 22 in pipe 200-clamping positions, and an illustration of the first pushing member 23 and the second pushing member 24 pushing the pipe 200 is omitted.

When the first clamping member 21 and the second clamping member 22 rotate to clamp the pipe 200, the first clamping member 21 applies a force to the pipe 200, with force components directed both toward the bearing seat 11 and toward the second clamping member 22. The second clamping member 22 applies a force to the pipe 200, with force components directed both toward the bearing seat 11 and toward the first clamping member 21.

In an embodiment, the material of the pipe 200 includes but is not limited to metal, polymer, glass, and ceramics. For example, the pipe 200 is a PVC pipe (polyvinylchlorid, with polyvinyl chloride as its main component).

Figure 3:
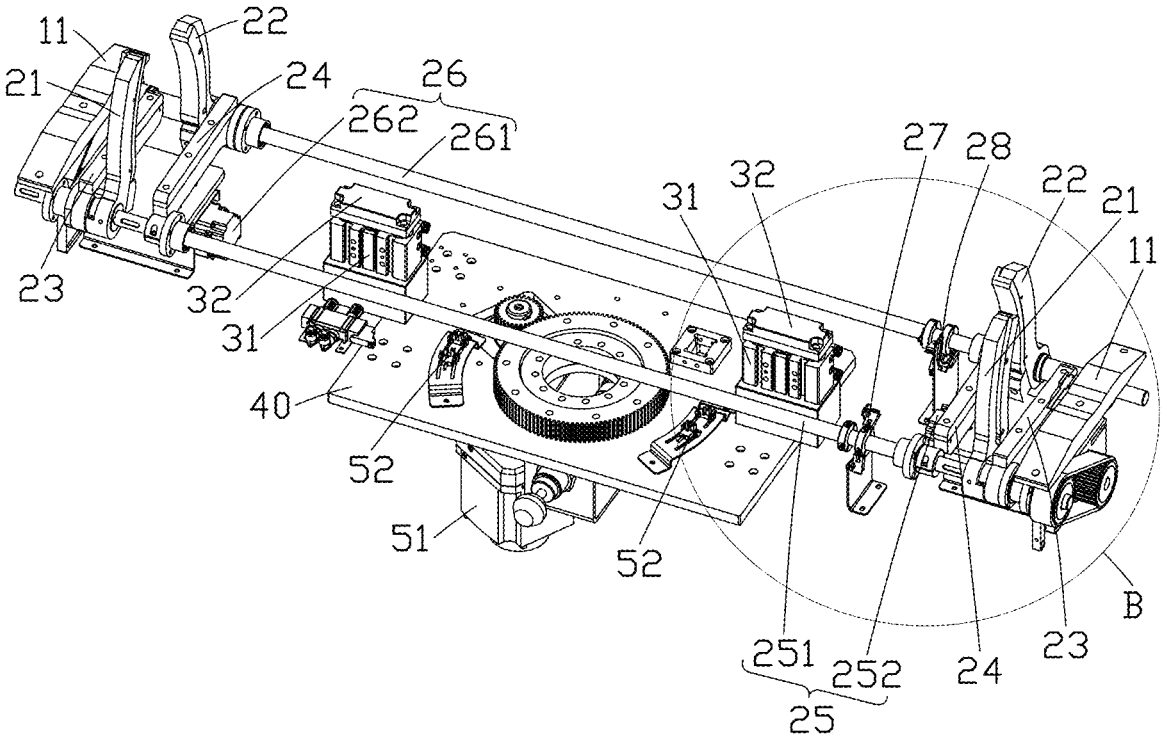
FIG. 3 is a diagrammatic view of the clamping and placing device shown in FIG. 1, a bearing frame is removed, according to an embodiment of the present application.

Referring to FIGS. 1 and 3, in an embodiment, the quantity of the bearing seat 11 is two. The two bearing seats 11 are distributed at intervals along the rotation axis of the first clamping member 21, the second clamping member 22, the first pushing member 23, and the second pushing member 24. The first clamping member 21, the second clamping member 22, the first pushing member 23, and the second pushing member 24 are located between the two bearing seats 11.

In another embodiment, the quantity of the bearing seat 11 is one, and the first clamping member 21, the second clamping member 22, the first pushing member 23, and the second pushing member 24 are distributed along the rotation axis and at one or both sides of the bearing seat 11. Or the quantity of the bearing seat 11 is more than two, and the first clamping member 21, the second clamping member 22, the first pushing member 23, and the second pushing member 24 are arranged in various configurations as needed.

Figure 4:
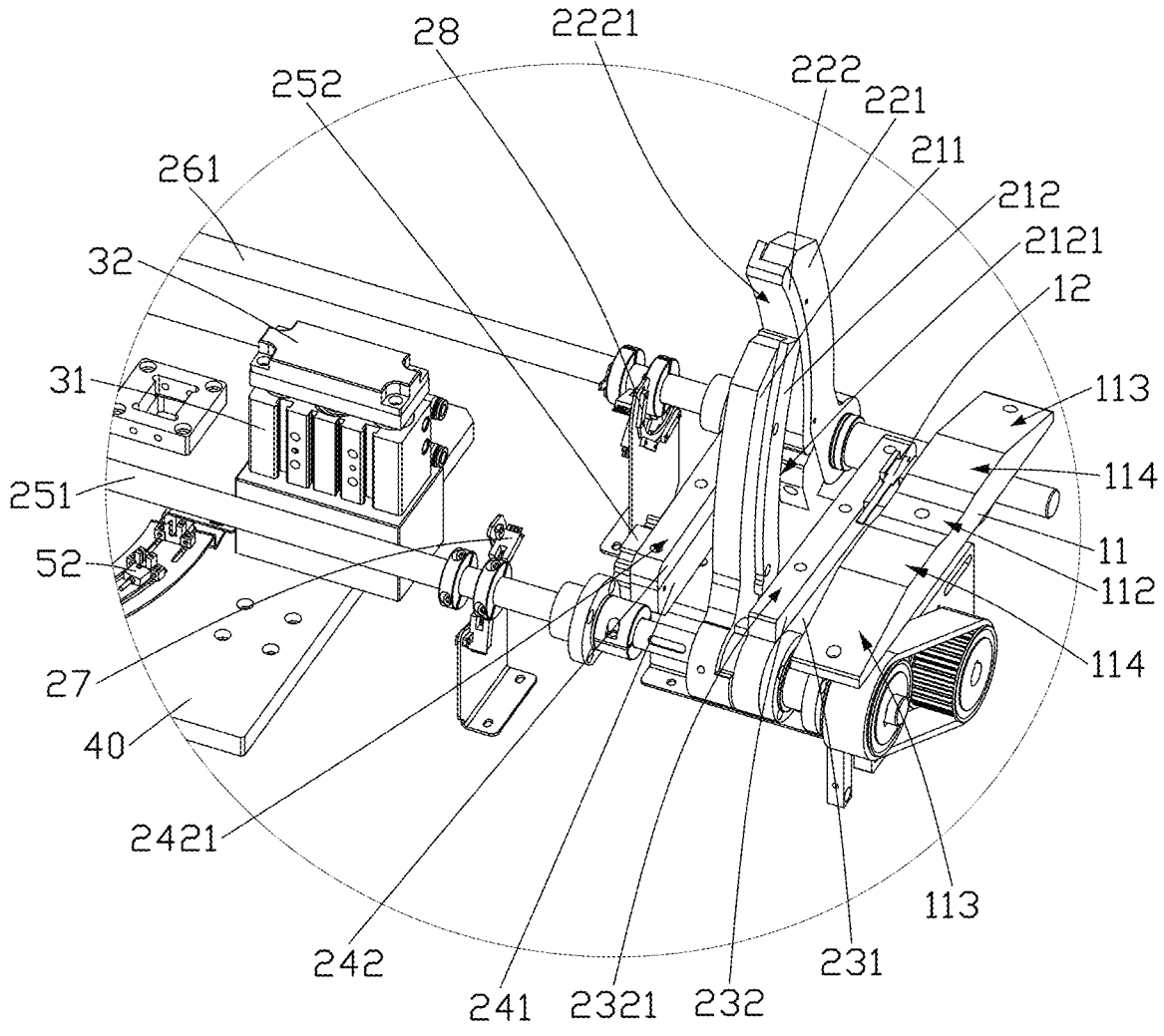
FIG. 4 is an enlarged view of portion B shown in FIG. 3 according to an embodiment of the present application.

Referring to FIGS. 2 to 4, in an embodiment, the bearing seat 11 is further provided with a recess 112. The recess 112 is recessed to form at least part of the bearing area 111. The first clamping member 21, the second clamping member 22, and the recess 112 are configured to collectively clamp the pipe 200. The bearing area 111 and the recess 112 are located on the same side of the bearing seat 11.

The recess 112 could support the pipe 200. The recessed structure of the recess 112 helps enhance the positioning of the pipe 200 on the bearing seat 11, avoiding or reducing the probability of misalignment of the pipe 200 on the bearing seat 11, and facilitating the first clamping member 21 and the second clamping member 22 in accurately locating and stably clamping the pipe 200.

Referring to FIGS. 2 and 4, in an embodiment, the bearing seat 11 is further provided with an incline section 113. The quantity of the incline sections 113 is two, and the two incline sections 113 locate on opposite sides of the recess 112. The distribution direction of the two incline sections 113 is the same as the distribution direction of the first clamping member 21 and the second clamping member 22. Each the incline section 113 slopes toward the recessed side of the recess 112 from the side close to the recess 112 to the side away from the recess 112.

When the clamping and placing device 100 is in use, the recessed direction of the recess 112 is the same as the direction of gravity. By providing the two incline sections 113, when the first pushing member 23 or the second pushing member 24 pushes the pipe 200 to move toward one side of the bearing area 111, the incline section 113 guides the rolling of the pipe 200 and the pipe 200 could automatically roll along the corresponding incline section 113, thereby reducing the force required for the first pushing member 23 or the second pushing member 24 to push the pipe 200, helping lower the structural strength and power consumption of the first pushing member 23 and the second pushing member 24.

Referring to FIGS. 2 and 4, in an embodiment, the bearing seat 11 is further provided with a planar section 114. The planar section 114 is between the incline section 113 and the recess 112. The surface of each planar section 114 facing the bearing area 111 is parallel to the distribution direction of the two planar sections 114.

When the clamping and placing device 100 is in use, the distribution direction of the two planar sections 114 is perpendicular to the direction of gravity, and the surface of the planar section 114 facing the bearing area 111 is horizontal. When the first pushing member 23 or the second pushing member 24 pushes the pipe 200 away from the recess 112, the pipe 200 first transitions via the planar section 114 before entering the incline section 113, ensuring smoother rolling of the pipe 200 leaved the bearing seat 11.

Referring to FIGS. 2 to 4, in an embodiment, the bearing mechanism 10 further includes a third sensor 12 fixed relative to the recess 112. The third sensor 12 is configured to detect the position of the pipe 200 relative to the recess 112.

When the third sensor 12 monitors the position of the pipe 200 on the recess 112 in place, the first rotating member 25 and the second rotating member 26 could be activated promptly once the pipe 200, improving operational efficiency.

In an embodiment, the third sensor 12 is a pressure detection device that determines the position of the pipe 200 relative to the recess 112 by detecting the pressure exerted by the pipe 200 on the third sensor 12.

In another embodiment, the third sensor 12 is a contact detection device, where the pipe 200 is considered correctly positioned once the pipe 200 presses the third sensor 12 into place. Or the third sensor 12 may be a displacement detection device, determining the position of the pipe 200 by measuring the distance between the pipe 200 and the third sensor 12.

In another embodiment, the third sensor 12 may use any other detection mechanism capable of determining the position of the pipe 200 relative to the recess 112.

Referring to FIGS. 1 and 3, in an embodiment, the bearing mechanism 10 further includes a bearing frame 13. The multiple bearing seats 11 are arranged on the bearing frame 13, and fixed relative to each other. The third sensor 12 is mounted on the bearing seat 11. In another embodiment, the third sensor 12 is alternatively mounted on the bearing frame 13.

Referring to FIG. 1, in an embodiment, the first rotating member 25 and the second rotating member 26 are mounted on the bearing seat 11, facilitating the rotation of the first clamping member 21, second clamping member 22, first pushing member 23, and second pushing member 24 relative to the bearing seat 11.

Referring to FIG. 1, in an embodiment, there are two each of the first clamping member 21, the second clamping member 22, the first pushing member 23, and the second pushing member 24. One first clamping member 21 and one second clamping member 22 are paired as a set, with two such sets spaced apart. Similarly, one first pushing member 23 and one second pushing member 24 are paired as a set, with two such sets spaced apart.

In another embodiment, there may be more pairs of the first clamping member 21 and the second clamping member 22, as well as more pairs of the first pushing member 23 and the second pushing member 24.

Referring to FIG. 2, in an embodiment, the angle between the first clamping member 21 and the first pushing member 23 is no less than 90°, ensuring that the first clamping member 21 does not obstruct the pipe 200 when the first pushing member 23 pushes the pipe 200. The angle between the second clamping member 22 and the second pushing member 24 is no less than 90°, preventing the second clamping member 22 from obstructing the pipe 200 when the second pushing member 24 pushes the pipe 200. The angle formed by the farthest radial ends of the first clamping member 21, the second clamping member 22, the first pushing member 23, and the second pushing member 24 relative to their rotational axis. As demonstrative examples, the angle may be 90°, 120°, 150°, 180°, 210°.

Referring to FIGS. 2 and 4, in an embodiment, the first clamping member 21 is provided with a first curved surface 2121. The first curved surface 2121 is configured to clamp the pipe 200. The second clamping member 22 is provided with a second curved surface 2221. The second curved surface 2221 is configured to clamp the pipe 200.

When the first clamping member 21 and the second clamping member 22 clamp the pipe 200, the first curved surface 2121 and the second curved surface 2221 conform to the shape of the pipe 200, minimizing displacement of the pipe 200 relative to the first clamping member 21 and second clamping member 22, and improving positional accuracy during clamping the pipe 200. The first pushing member 23 and the second pushing member 24 could accurately push the pipe 200 into the desired position during releasing the pipe 200.

Referring to FIGS. 2 and 4, in an embodiment, the first pushing member 23 is provided with a first plane 2321. The first plane 2321 is configured to push the pipe 200. The second pushing member 24 is provided with a second plane 2421. The second plane 2421 is configured to push the pipe 200.

When the first pushing member 23 or the second pushing member 24 actuates the pipe 200, the first plane 2321 or the second plane 2421 remains tangent to the outer circumference of the pipe 200, ensuring smooth motion along the first plane 2321 or the second plane 2421 and facilitating the seamless release of the pipe 200 from the bearing seat 11 or the bearing area 111.

Referring to FIGS. 2 and 4, in an embodiment, the first clamping member 21 includes a first connecting section 211 and a first buffer section 212. The first connecting section 211 is coupled to the first rotating member 25, while the first buffer section 212 is connected to the first connecting section 211 and serves as the clamping interface for the pipe 200.

The second clamping member 22 includes a second connecting section 221 and a second buffer section 222. The second connecting section 221 is coupled to the second rotating member 26, and the second buffer section 222 is connected to the second connecting section 221, functioning as the clamping interface for the pipe 200.

The first pushing member 23 comprises a third connecting section 231 and a third buffer section 232. The third connecting section 231 is connected to the first rotating member 25, while the third buffer section 232 is connected to the third connecting section 231 and configured to clamp the pipe 200.

The second pushing member 24 includes a fourth connecting section 241 and a fourth buffer section 242. The fourth connecting section 241 is connected to the second rotating member 26, and the fourth buffer section 242 is connected to the fourth connecting section 241 and configured to clamp the pipe 200.

The impact of the first buffer section 212, second buffer section 222, third buffer section 232, and fourth buffer section 242 on the pipe 200 is reduced when the pipe 200 is clamped by the first clamping member 21 and the second clamping member 22 or pushed by the first pushing member 23 and the second pushing member 24, helping protect the pipe 200 and enhance positioning accuracy.

In an embodiment, the first curved surface 2121 is provided on the first buffer section 212, and the second curved surface 2221 is provided on the second buffer section 222. The first plane 2321 is provided on the third buffer section 232, and the second plane 2421 is provided on the fourth buffer section 242.

Referring to FIGS. 2 and 4, in an embodiment, the connections between the first buffer section 212 and the first connecting section 211, the second buffer section 222 and the second connecting section 221, the third buffer section 232 and the third connecting section 231, the fourth buffer section 242 and the fourth connecting section 241 are all detachable, facilitating the replacement of the first buffer section 212, the second buffer section 222, the third buffer section 232, and the fourth buffer section 242.

Referring to FIG. 3, in an embodiment, the first rotating member 25 includes a first rotating rod 251 and a first rotation drive 252. The first rotating rod 251 is rotatably mounted to the bearing seat 11. The first clamping member 21 and the first pushing member 23 are connected to the first rotating rod 251. The first rotation drive 252 is fixed to the bearing seat 11 and configured to drive the first rotating rod 251 to rotate.

The second rotating member 26 includes a second rotating rod 261 and a second rotation drive 262. The second rotating rod 261 is rotatably mounted to the bearing seat 11 and is arranged parallel to the first rotating rod 251. The second clamping member 22 and the second pushing member 24 are attached to the second rotating rod 261. The second rotation drive 262 is fixed to the bearing seat 11 and configured to drive the second rotating rod 261 to rotate.

In an embodiment, the first rotating rod 251 and the second rotating rod 261 are arranged parallel and radially spaced apart.

The rotation of the first rotating rod 251 driven by the first rotation drive 252 and the rotation of the second rotating rod 261 driven by the second rotation drive 262 operate independently, thus the movements of the first pushing member 23 and the second pushing member 24 are independent, and the pipe 200 exits the bearing area 111 from the side of the first pushing member 23 or the second pushing member 24.

For example, when clamping the pipe 200, both the first rotation drive 252 and the second rotation drive 262 are activated simultaneously, rotating the first rotating rod 251 and the second rotating rod 261 together, so that the first clamping member 21 and the second clamping member 22 clamp the pipe 200.

When the pipe 200 exits from a side of the first pushing member 23, the first rotation drive 252 is activated while the second rotation drive 262 remains idle, and the first rotating rod 251 rotates while the second rotating rod 261 remains idle, allowing the first clamping member 21 to clear the exit path of the pipe 200 while the first pushing member 23 pushes the pipe 200, and allowing the second clamping member 22 to remain fixed to prevent the pipe 200 from exiting from an opposite side of the first pushing member 23.

When the pipe 200 exits from a side of the second pushing member 24, the second rotation drive 262 is activated while the first rotation drive 252 remains idle, and the second rotating rod 261 rotates while the first rotating rod 251 stays stationary, causing the second clamping member 22 to clear the exit path of the pipe 200 while the second pushing member 24 pushes the pipe 200, and allowing the first clamping member 21 to remain fixed to prevent the pipe from exiting from an opposite side of the second pushing member 24.

Referring to FIGS. 3 and 4, in an embodiment, the first rotation drive 252 is an electric motor that connects to the first rotating rod 251 via a belt or gear transmission. The second rotation drive 262 is an electric motor, connected to the second rotating rod 261 through a belt or gear mechanism.

Compared to directly mounting the first rotating rod 251 to the output shaft of the first rotation drive 252 or the second rotating rod 261 to the output of the second rotation drive 262, using belt or gear transmission allows flexible adjustment of the positioning between the first rotation drive 252 and the first rotating rod 251 and the positioning between the second rotation drive 262 and the second rotating rod 261, and helps optimize space utilization.

Referring to FIGS. 3 and 4, in an embodiment, the clamping and placing mechanism 20 further includes a first sensor 27 and a second sensor 28. The first sensor 27 and the second sensor 28 are fixed to the bearing seat 11. The first sensor 27 is configured to detect the rotational position of the first rotating rod 251, and the second sensor 28 is configured to monitor the rotational position of the second rotating rod 261.

Detection of the rotational position of first rotating rod 251 by first sensor 27 and detection of the rotational position of second rotating rod 261 by second sensor 28 enhance the accuracy of the rotational positions of first rotating rod 251 and second rotating rod 261, and ensure that the first clamping member 21 and second clamping member 22 rotate to precise positions. For example, move the pipe 200 between the first clamping member 21 and the second clamping member 22, or accurately and stably clamp pipe 200. It facilitates the precise rotation of the first pushing member 23 and the second pushing member 24 to their designated positions, allowing them to accurately and stably push pipe 200 out of bearing area 111.

In an embodiment, the first sensor 27 and second sensor 28 are configured with multiple detection positions. The multiple detection positions include (but not limited to) a receiving position for the pipe 200, a clamping position for securing the pipe 200, and a pushing position for ejecting the pipe 200 from the bearing area 111.

In an embodiment, the first sensor 27 and second sensor 28 may be photoelectric devices with multiple detection points arranged circumferentially around the first rotating rod 251 and second rotating rod 261 to enable precise angular positioning feedback.

Referring to FIGS. 1, 3, and 4, in an embodiment, the clamping and placing device 100 further includes a lifting mechanism 30. The lifting mechanism 30 comprises a lifting drive 31 and a lifting member 32. The lifting drive 31 is fixed to the bearing seat 11, and the lifting member 32 is mounted on the lifting drive 31. The lifting drive 31 is configured to drive the lifting member 32 to move.

The movement direction of the lifting member 32 intersects with the rotational axes of the first pushing member 23 and the second pushing member 24, and the lifting member 32 could enter the bearing area 111.

The lifting drive 31 actuates the lifting member 32 to push the pipe 200 away from the bearing seat 11, reducing frictional resistance between the pipe 200 and the bearing seat 11, and facilitating smoother ejection of the pipe 200 from the bearing area 111 by either the first pushing member 23 or the second pushing member 24. The lifting member 32 could elevate the pipe 200 out of the recess 112, reducing the driving force required for rotating the first pushing member 23 or second pushing member 24.

In an embodiment, the lifting drive 31 is a pneumatic cylinder, electric motor, hydraulic cylinder, or similar actuator.

Referring to FIG. 3, in an embodiment, the quantity of the lifting mechanism 30 is multiple, and the multiple lifting mechanisms 30 are arranged in parallel at axial intervals along the first rotating rod 251 and second rotating rod 261.

Referring to FIGS. 1 and 3, in an embodiment, the bearing frame 13 surrounds the lifting mechanism 30 and is provided with an opening allowing passage of the lifting member 32.

Referring to FIG. 1, in an embodiment, the clamping and placing device 100 further includes a base 40 and a position changing mechanism 50. The position changing mechanism 50 is mounted on the base 40. The bearing mechanism 10 and the clamping and placing mechanism 20 are installed on the position changing mechanism 50. The position changing mechanism 50 is configured to rotate or linearly displace the bearing mechanism 10 and clamping and placing mechanism 20 relative to the base 40.

The position changing mechanism 50 drives the bearing mechanism 10 and the clamping and placing mechanism 20 to rotate or move together, ensuring that the clamping and placing device 100 maintains a secure grip on pipe 200 when relocating or reorienting the pipe 200, and improving the precision of pipe 200 transfer.

Referring to FIG. 3, in an embodiment, the position changing mechanism 50 drives the bearing mechanism 10 and clamping and placing mechanism 20 to rotate, thereby changing the orientation of the pipe 200. The position changing mechanism 50 includes a rotation drive 51 mounted on the base 40. The bearing mechanism 10 and the clamping and placing mechanism 20 are installed on the rotation drive 51. The rotation drive 51 is configured to move the bearing mechanism 10 and the clamping and placing mechanism 20 relative to the base 40.

In an embodiment, the bearing seat 11 is mounted on the rotation drive 51 via the bearing frame 13, and the first rotating member 25 and second rotating member 26 are fixed to the bearing frame 13.

In an embodiment, the rotation drive 51 consists of a combination of an electric motor and a gear transmission mechanism.

In other embodiments, the rotation drive 51 may alternatively be a pneumatic cylinder, electric motor, hydraulic cylinder, or similar actuator directly connected to the bearing mechanism 10.

Referring to FIG. 3, in an embodiment, the position changing mechanism 50 further includes a fourth sensor 52 mounted on the base 40. The fourth sensor 52 is configured to detect the position of the bearing mechanism 10 and the clamping and the placing mechanism 20. The fourth sensor 52 monitors the positioning of the bearing mechanism 10 and clamping and placing mechanism 20, ensuring precise alignment before clamping or releasing pipe 200, thereby improving transfer accuracy.

The fourth sensor 52 is set with multiple detection positions, for example, the detection position includes a receiving position for the pipe 200, and a redirected exit position for the pipe 200.

In an embodiment, the fourth sensor 52 may be a photoelectric sensing device with multiple detection points arranged circumferentially around the rotation drive 51 for angular position feedback.

Referring to FIGS. 1 to 3, the operational workflow of the clamping and placing device 100 in an embodiment is as follows:

When no directional change is required for the pipe 200, the first clamping member 21 and the second clamping member 22 clamp the pipe 200 on the bearing seat 11, and the first rotating rod 251 or the second rotating rod 261 rotates to drive the first pushing member 23 or the second pushing member 24, thereby pushing the pipe 200 away from the bearing seat 11.

When directional change of the pipe 200 is required, the first clamping member 21 and the second clamping member 22 clamp the pipe. The rotation drive 51 then drives the bearing frame 13 to rotate, changing the orientation of the pipe 200. Subsequently, the first rotating rod 251 or the second rotating rod 261 rotates, causing the first pushing member 23 or the second pushing member 24 to push the pipe 200 away from the bearing seat 11.

In another embodiment, the first pushing member 23 or the second pushing member 24 may be omitted, allowing the pipe 200 release from one side of the clamping and placing device 100. Or the position changing mechanism 50 reorients the pipe 200 before pushing the pipe 200 out via the first pushing member 23, enabling the pipe 200 release from different sides of the clamping and placing device 100.

In some embodiments, the first clamping member 21 and the second clamping member 22 may be driven by separate rotating mechanisms-meaning the first clamping member 21 and the first pushing member 23 are operated by independent drives, and the second clamping member 22 and the second pushing member 24 are operated by independent drives.

In an embodiment, the clamping and placing device 100 further includes a controller. The controller is electrically or signal-connected to the first rotating member 25, the second rotating member 26, the third sensor 12, the first sensor 27, the second sensor 28, the lifting drive 31, and the fourth sensor 52. The clamping and placing device 100 operates these components via the controller, which may be either integrated or externally linked.

Additionally, in alternative designs, the first clamping member 21 and the second clamping member 22 could be combined into a single clamping mechanism. For example, the clamping mechanism is a gripper cylinder mounted on the bearing seat 11, and could clamp the pipe 200 without the first rotating member 25 and the second rotating member 26.

The terms used in the present application, such as "first" and "second", do not intended to indicate any order, quantity, or importance of related components, but are only used for differentiation between the related components.

As used in the present application, the term "a" or "one" do not intended to limit the quantity of the related object, but to indicate the existence of at least one related object.

In the present application, the terms indicating direction or position, such as "top", "bottom", "side", "longitudinal", "transverse", "middle", "center, "outer", "inner", "horizontal", "vertical", "left", "right", "upper", and "lower", refers to a relative position rather than an absolute position.

The terms used in the present application, such as "substantially", "whole", "approximate", and "similar", are intended to indicate that the object has related characteristics but allow for certain deviations. The deviation may depend on a specific background. For example, the dimension of deviation may depend on a specific background, including but not limited to national standards for dimensional tolerances.

What is claimed is:

1. A clamping and placing device configured to clamp and place a pipe, the clamping and placing device comprising:
   a bearing mechanism comprising a bearing seat defining a bearing area; and
   a clamping and placing mechanism comprising:
   a first clamping member;
   a second clamping member configured to clamp the pipe in the bearing area with the first clamping member or release the pipe;
   a first pushing member wherein in response to the first pushing member been rotated through the bearing area, the first pushing member pushes the pipe out of the bearing area in a pushing direction;
   a first rotating member connected to the first pushing member and configured to drive the first pushing member to rotate;
   a second pushing member, wherein in response to the second pushing member been rotated through the bearing area, the second pushing member pushes the pipe out of the bearing area in a direction opposite to the pushing direction; and
   a second rotating member connected to the second pushing member and configured to drive the second pushing member to rotate;
   wherein the first clamping member is connected to the first rotating member, and the first rotating member is configured to drive the first clamping member to rotate; the second clamping member is connected to the second rotating member, and the second rotating member is configured to drive the second clamping member to rotate; the first rotating member comprises a first rotating rod and a first rotation drive; the first rotating rod is rotatably connected to the bearing seat; the first clamping member and the first pushing member are connected to the first rotating rod; the first rotation drive is arranged on the bearing seat and configured to drive the first rotating rod to rotate; the second rotating member comprises a second rotating rod and a second rotation drive; the second rotating rod is rotatably connected to the bearing seat and is parallel to the first rotating rod; the second clamping member and the second pushing member are connected to the second rotating rod; the second rotation drive is arranged on the bearing seat and configured to drive the second rotating rod to rotate.

2. The clamping and placing device of claim 1, wherein the first pushing member, the second pushing member, the first clamping member, and the second clamping member are arranged in a staggered arrangement along a rotational axis direction of the first rotating member or the second rotating member.

3. The clamping and placing device of claim 1, wherein the clamping and placing mechanism further comprises a first sensor and a second sensor, the first sensor and the second sensor are fixed arranged on the bearing seat;
   the first sensor is configured to detect a rotational position of the first rotating rod, and the second sensor is configured to detect a rotational position of the second rotating rod.

4. The clamping and placing device of claim 1, wherein the first clamping member comprises a first connecting section and a first buffer section, the first connecting section is connected to the first rotating member, and the first buffer section is connected to the first connecting section and configured to clamp the pipe;
   the second clamping member comprises a second connecting section and a second buffer section; the second connecting section is connected to the second rotating member, and the second buffer section is connected to the second connecting section and configured to clamp the pipe;
   the first pushing member comprises a third connecting section and a third buffer section;
   the third connecting section is connected to the first rotating member, and the third buffer section is connected to the third connecting section and configured to clamp the pipe;
   the second pushing member comprises a fourth connecting section and a fourth buffer section; the fourth connecting section is connected to the second rotating member, and the fourth buffer section is connected to the fourth connecting section and configured to clamp the pipe.

5. The clamping and placing device of claim 1, wherein the bearing seat comprises a recess, and the first clamping member, the second clamping member, and the recess are configured to clamp the pipe.

6. The clamping and placing device of claim 5, wherein the bearing mechanism further comprises a third sensor arranged on the recess and configured to detect a position of the pipe relative to the recess.

7. The clamping and placing device of claim 1, wherein the first clamping member defines a first curved surface, and the second clamping member defines a second curved surface;

the first clamping member and the second clamping member clamp the pipe by the first curved surface and the second curved surface, respectively.

8. The clamping and placing device of claim 1, further comprising a lifting mechanism comprising a lifting drive and a lifting member, wherein the lifting drive is arranged on the bearing seat, and the lifting member is arranged on the lifting drive;

the lifting drive is configured to drive the lifting member to move and enter the bearing area, and a movement direction of the lifting member intersects with a rotation axis of the first pushing member.

9. The clamping and placing device of claim 8, wherein the bearing mechanism further comprises a bearing frame connected to the bearing seat and surrounding an outer side of the lifting mechanism;

the bearing frame comprises an opening, the lifting member is extendable through the opening.

10. The clamping and placing device of claim 1, further comprising a base and a position changing mechanism, wherein the position changing mechanism is arranged on the base, and the bearing mechanism and the clamping and placing mechanism are arranged on the position changing mechanism;

the position changing mechanism is configured to drive the bearing mechanism and the clamping and placing mechanism to rotate or move.

11. The clamping and placing device of claim 10, wherein the position changing mechanism comprises a rotation drive and a fourth sensor, and the rotation drive is arranged on the base, and the bearing mechanism and the clamping and placing mechanism are arranged on the rotation drive;

the rotation drive is configured to drive the bearing mechanism and the clamping and placing mechanism to move;

the fourth sensor is arranged on the base and configured to detect a movement position of the bearing mechanism and a movement position of the clamping and placing mechanism.

12. A clamping and placing device configured to clamp and place a pipe, the clamping and placing device comprising:

a bearing mechanism comprising a bearing seat comprising a bearing area; and a clamping and placing mechanism comprising:

at least one clamping mechanism configured to clamp the pipe in the bearing area or release the pipe;

a rotating mechanism; and at least one pushing mechanism connected to the rotating mechanism and configured to be driven by the rotating mechanism to rotationally extend through the bearing area and push the pipe out of the bearing area;

wherein the clamping mechanism comprises a first clamping member and a second clamping member, the first clamping member and the second clamping member are configured to rotate in opposite directions, respectively, to clamp or release the pipe;

the pushing mechanism comprises a first pushing member and a second pushing member; and the rotating mechanism comprises a first rotating member and a second rotating member, wherein the first rotating member is connected to the first pushing member and configured to drive the first pushing member to rotate;

the second rotating member is connected to the second pushing member and configured to drive the second pushing member to rotate;

the first rotating member comprises a first rotating rod and a first rotation drive; the first rotating rod is rotatably connected to the bearing seat; the first clamping member and the first pushing member are connected to the first rotating rod; the first rotation drive is arranged on the bearing seat and configured to drive the first rotating rod to rotate; the second rotating member comprises a second rotating rod and a second rotation drive; the second rotating rod is rotatably connected to the bearing seat and is parallel to the first rotating rod; the second clamping member and the second pushing member are connected to the second rotating rod; the second rotation drive is arranged on the bearing seat and configured to drive the second rotating rod to rotate; and along a rotational axis direction of the rotating mechanism, the first clamping mechanism and the second clamping mechanism are spaced apart, and the first pushing mechanism the second pushing mechanism are spaced apart.

13. The clamping and placing device of claim 12, wherein the bearing seat is provided with a recess, and the clamping mechanism and the recess are configured to clamp the pipe;

the bearing mechanism further comprises a third sensor, and the third sensor is arranged on the recess and configured to detect a position of the pipe relative to the recess.

14. The clamping and placing device to claim 12, further comprising a lifting mechanism comprising a lifting drive and a lifting member, wherein the lifting drive is arranged on the bearing seat, and the lifting member is arranged on the lifting drive;

the lifting drive is configured to drive the lifting member to move and enter the bearing area, and a movement direction of the lifting member intersects with a rotation axis of the at least one pushing mechanism.

15. The clamping and placing device of claim 12, further comprising a position changing mechanism, wherein the bearing mechanism and the clamping and placing mechanism are arranged on the position changing mechanism;

the position changing mechanism is configured to drive the bearing mechanism and the clamping and placing mechanism to rotate or move.

* * * * *